United States Patent
Pottier et al.

(10) Patent No.: US 9,617,662 B2
(45) Date of Patent: Apr. 11, 2017

(54) TWO-LAYERED METAL CORD RUBBERIZED IN SITU BY AN UNSATURATED THERMOPLASTIC ELASTOMER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Thibaud Pottier, Clermont-Ferrand (FR); Sébastien Rigo, Clermont-Ferrand (FR); Jérémy Toussain, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 309 days.

(21) Appl. No.: 14/358,126

(22) PCT Filed: Nov. 14, 2012

(86) PCT No.: PCT/EP2012/072540
§ 371 (c)(1),
(2) Date: May 14, 2014

(87) PCT Pub. No.: WO2013/075984
PCT Pub. Date: May 30, 2013

(65) Prior Publication Data
US 2014/0311120 A1    Oct. 23, 2014

(30) Foreign Application Priority Data
Nov. 23, 2011    (FR) ...................... 11 60671

(51) Int. Cl.
*D02G 3/48* (2006.01)
*B60C 9/00* (2006.01)
(Continued)

(52) U.S. Cl.
CPC ............. *D02G 3/48* (2013.01); *B60C 9/0007* (2013.04); *D07B 1/062* (2013.01); *D07B 1/0613* (2013.01);
(Continued)

(58) Field of Classification Search
CPC ........ D02G 3/48; D07B 1/062; D07B 1/0626; D07B 7/145
See application file for complete search history.

(56) References Cited

U.S. PATENT DOCUMENTS

| 6,579,940 B1 | 6/2003 | Dove ............................... 525/98 |
| 8,166,741 B2 | 5/2012 | Barguet et al. ................. 57/216 |

(Continued)

FOREIGN PATENT DOCUMENTS

| EP | 1 186 699 A2 | 3/2002 |
| WO | WO 2006/013077 A1 | 2/2006 |

(Continued)

OTHER PUBLICATIONS

E. Custodero, U.S. Appl. No. 14/358,089, filed Nov. 14, 2012.

*Primary Examiner* — Shaun R Hurley
(74) *Attorney, Agent, or Firm* — Fitzpatrick, Cella, Harper & Scinto (57) ABSTRACT

A metal cord has an M+N construction with two concentric layers. An internal first layer or core includes M wire(s) of diameter $d_1$, M having a value from 1 to 4. An external second layer includes N wires of diameter $d_2$ and is positioned around the core, the N wires being wound in a helix. Between the wires of the two layers are gaps, some or all of which include a filling rubber based on an unsaturated (Continued)

thermoplastic elastomer. The filling rubber may be, for example, based on an SBS or an SIS block copolymer. When used in a molten state, the thermoplastic elastomer presents no problem due to unwanted stickiness if the filling rubber overspills outside the cord after manufacture. The unsaturated and therefore (co)vulcanizable nature of the thermoplastic elastomer makes it compatible with diene rubber matrices used as calendering rubber in metal fabrics intended for reinforcing tires.

12 Claims, 4 Drawing Sheets

(51) Int. Cl.
    *D07B 1/06*         (2006.01)
    *D07B 5/12*         (2006.01)
    *D07B 7/14*         (2006.01)

(52) U.S. Cl.
    CPC .............. *D07B 1/0626* (2013.01); *D07B 5/12* (2013.01); *D07B 7/145* (2013.01); *D07B 2201/2023* (2013.01); *D07B 2201/2027* (2013.01); *D07B 2201/2046* (2013.01); *D07B 2201/2059* (2013.01); *D07B 2201/2061* (2013.01); *D07B 2201/2062* (2013.01); *D07B 2201/2065* (2013.01); *D07B 2201/2082* (2013.01); *D07B 2205/2003* (2013.01); *D07B 2205/2017* (2013.01); *D07B 2205/2082* (2013.01); *D07B 2207/205* (2013.01); *D07B 2207/4072* (2013.01); *D07B 2501/2046* (2013.01)

(56) References Cited

U.S. PATENT DOCUMENTS

| | | | |
|---|---|---|---|
| 8,191,348 B2 | 6/2012 | Barguet et al. | 57/223 |
| 8,245,490 B2 | 8/2012 | Barguet et al. | 57/217 |
| 8,627,696 B2 | 1/2014 | Pottier et al. | 72/64 |
| 2006/0237110 A1 | 10/2006 | Barguet et al. | 352/451 |
| 2008/0115874 A1* | 5/2008 | Thielen | B60C 1/00 152/541 |
| 2011/0011486 A1* | 1/2011 | Pottier | D07B 5/12 140/149 |
| 2011/0017376 A1 | 1/2011 | Pottier et al. | 152/451 |
| 2011/0198008 A1 | 8/2011 | Pottier et al. | 152/451 |
| 2011/0315296 A1 | 12/2011 | Cogne et al. | 152/556 |
| 2012/0000590 A1 | 1/2012 | Cogne et al. | 152/564 |
| 2012/0044964 A1 | 2/2012 | Yang et al. | 428/378 |
| 2012/0125506 A1 | 5/2012 | Custodero et al. | 152/451 |
| 2012/0174557 A1 | 7/2012 | Boisseau et al. | 57/213 |
| 2013/0220505 A1 | 8/2013 | Pottier et al. | 152/451 |
| 2013/0220506 A1 | 8/2013 | Pottier et al. | 152/451 |
| 2013/0227924 A1 | 9/2013 | Custodero et al. | 57/3 |
| 2013/0232936 A1 | 9/2013 | Custodero et al. | 57/7 |
| 2014/0045983 A1 | 2/2014 | Abad et al. | 524/440 |

FOREIGN PATENT DOCUMENTS

| | | |
|---|---|---|
| WO | WO 2007/090603 A1 | 8/2007 |
| WO | WO 2009/083212 A1 | 7/2009 |
| WO | WO 2009/083213 A1 | 7/2009 |
| WO | WO 2010/012411 A1 | 2/2010 |
| WO | WO 2010/072463 A1 | 7/2010 |
| WO | WO 2010/072464 A1 | 7/2010 |
| WO | WO 2010/105975 A1 | 9/2010 |
| WO | WO 2011/000963 A2 | 1/2011 |
| WO | WO 2011/144469 A1 | 11/2011 |
| WO | WO 2011/144471 A1 | 11/2011 |
| WO | WO 2011/144472 A1 | 11/2011 |
| WO | WO 2011/144473 A1 | 11/2011 |

\* cited by examiner

Fig. 6

TWO-LAYERED METAL CORD RUBBERIZED IN SITU BY AN UNSATURATED THERMOPLASTIC ELASTOMER

FIELD OF THE INVENTION

The present invention relates to metal cords with two concentric layers, of M+N construction, formed of an internal central first layer of M wire(s) which is surrounded by an external second layer of N wires, which can be used notably for reinforcing items made of rubber, more particularly relating to the two-layer metal cords of the "rubberized in situ" type, namely those rubberized from the inside, while they are actually being manufactured with rubber or a rubber compound.

RELATED ART

It also relates to the use of such cords in tyres and notably in the carcass reinforcements, also referred to as "carcasses" thereof or the crown reinforcements, also referred to as "belts" thereof, and more particularly to the reinforcements of the carcasses or belts of tyres for industrial vehicles.

A radial tyre comprises in the known way a tread, two inextensible beads, two sidewalls connecting the beads to the tread and a belt arranged circumferentially between the carcass reinforcement and the tread. The carcass reinforcement is made of at least one ply (or "layer") of rubber which is reinforced with reinforcing elements (or "reinforcers") such as cords or monofilaments generally of the metallic type in the case of tyres for industrial vehicles which carry heavy loads.

The belt is made up of various plies or layers of rubber which may or may not be reinforced with reinforcers such as cords or monofilaments, notably of metallic type. The belt generally comprises at least two superposed belting plies, sometimes referred to as "working plies" or "cross plies", the metallic reinforcing cords of which are arranged parallel to one another within a ply, but are crossed from one ply to the other, which means to say inclined, either symmetrically or otherwise, with respect to the median circumferential plane by an angle which is generally comprised between 10° and 45° depending on the type of tyre in question. These cross plies may be supplemented by various other auxiliary plies or layers of rubber, of widths that vary according to circumstance, and which may or may not contain reinforcers; by way of example mention may be made of what are known as "protective" plies which have the role of protecting the rest of the belt from external attack, perforation, or even of plies referred to as "hooping plies" which contain reinforcers oriented substantially in the circumferential direction (plies referred to as "zero degree" plies).

It is known that a tyre belt needs to meet numerous, often conflicting, requirements, notably:
  needing to be as rigid as possible for small deformation, because it plays a substantial part in rigidifying the crown of the tyre;
  needing to have the lowest possible hysteresis in order firstly to minimize the heating of the crown internal region during running and secondly to reduce the rolling resistance of the tyre, which goes hand in hand with saving fuel;
  and finally needing to have high endurance, particularly with regard to the phenomenon of separation, cracking of the ends of the cross plies in the shoulder region of the tyre, known by the name of "cleavage", which notably means that the metallic cords that reinforce the plies need to have high compression fatigue strength, all of this in a fairly corrosive environment.

The third requirement is particularly important to tyre casings for industrial vehicles such as heavy goods vehicles which are designed to be retreaded one or more times when the treads that they comprise reach a critical level of tyre wear after prolonged running.

The availability of increasingly strong and durable carbon steels means that tyre manufacturers are now, wherever possible, leaning towards the use of cords that have just two layers, in order notably to simplify the manufacture of these cords, reduce the thickness of the composite reinforcing plies and thus the hysteresis of the tyres and ultimately reduce the costs of the tyres themselves and reduce the energy consumption of vehicles fitted with such tyres.

It is also known that the fatigue-fretting-corrosion endurance of layered cords, particularly in the crown or carcass reinforcements of the tyres, is notably improved by the presence of rubber actually within these cords and opposing the circulation of corrosive agents such as water or oxygen along empty channels formed by the wires that make up these cords, whether this rubber:
  and this is the most commonplace scenario nowadays, is applied to the inside of the cord later, during the final curing of the tyre that the cord is intended to reinforce, provided that the architecture of this cord, once manufacture is over, is sufficiently aerated and therefore penetrable by rubber;
  or even, and this is even better, is already incorporated into the cord in situ during the very manufacture of the cord, making it possible at the same time to use cords with greater compactness (which are less aerated), something which incidentally is preferable if there is notably a desire to continue to be able notably to reduce the thickness and hysteresis of the rubber plies.

Applications WO 2006/013077, WO 2007/090603, WO 2009/083212, WO 2009/083213, WO 2010/012411, filed by the Applicant companies, have described such two-layer cords of the type rubberized in situ, and the methods of manufacturing them. These cords have the feature in common of being rubberized from the inside, while they are actually being manufactured, with a rubber referred to as a filling rubber consisting of a composition in the raw (i.e. unvulcanized) state of a diene rubber such as natural rubber.

If it is desirable to be able to guarantee a high level of penetration by the rubber into the cord in order to obtain an air permeability of the cord, along its axis, which is as low as possible then it is necessary, depending on the type of cord and the methods used, to use fairly significant quantities of rubber during the sheathing and this in certain cases may lead to a risk of unwanted overspilling of raw rubber at the periphery of the finished manufactured cord.

Now, because of the high (in this instance unwanted) stickiness that these diene rubber compounds have in the raw state, an accidental overspill, even a very a small one, at the periphery of the cords while these are being manufactured may lead to significant inconveniences in the later handling of the cords, particularly during the operations that follow for incorporating the cord into a strip of diene rubber (itself in the raw state), prior to the later operations of manufacturing the tyre and final curing (crosslinking).

Such disadvantages have notably been described in the abovementioned applications WO 2009/083212, WO 2009/083213 and WO 2010/012411. Ultimately of course they slow the production rates and have a negative impact on the end cost of the cords and of the tyres that they reinforce.

BRIEF DESCRIPTION OF EMBODIMENTS OF THE INVENTION

Now, in pursuing their research, the Applicant companies have discovered a novel two-layer cord, rubberized in situ with a special rubber, that allows the aforementioned disadvantages to be alleviated.

Accordingly, a first subject of the invention is a metal cord with two concentric layers (Ci, Ce), of M+N, construction, comprising an internal first layer or core (Ci) made of M wire(s) of diameter $d_1$, M varying from 1 to 4, around which core are wound together in a helix, as an external second layer (Ce), N wires of diameter $d_2$, in which at least some of the gaps between the wires of the various layers contain rubber or a rubber compound, this cord being characterized in that the said rubber is an unsaturated thermoplastic elastomer.

This two-layer cord of the invention no longer presents any problems of unwanted stickiness in the event of an overspill outside the cord after it has been manufactured. The unsaturated and therefore (co)vulcanizable nature of this thermoplastic elastomer makes the cord thus prepared extremely compatible with the diene rubber matrices usually used as calendering rubber in the metallic fabrics intended for reinforcing tyres.

Furthermore, the above thermoplastic elastomer is, by definition, a hot melt elastomer, and therefore easier to work than an elastomer of the diene type; thus, the quantity of it can be more easily controlled and it is possible, by altering the working temperature, to distribute the thermoplastic elastomer uniformly within each of the gaps of the cord, giving this cord optimal impermeability along its longitudinal axis without even worrying about any overspill at the periphery of the cord.

The invention also relates to the use of a cord according to the invention for reinforcing finished items or semifinished products made of rubber, for example plies, hoses, belts, conveyer belts, tyres.

The cord of the invention is more particularly intended to be used as a reinforcing element for a carcass or crown reinforcement of tyres for industrial vehicles (which carry heavy loads) chosen from vans and vehicles referred to as "heavy vehicles" which means metro vehicles, buses, road transport vehicles such as lorries, tractors, trailers, or even off-road vehicles, agricultural vehicles or construction plant vehicles and any other type of transport or handling vehicles.

The invention also relates to these finished items or semifinished products made of rubber themselves when they are reinforced with a cord according to the invention, particularly the tyres intended for industrial vehicles of the van or heavy vehicle type.

BRIEF DESCRIPTION OF THE DRAWINGS

The invention and the advantages thereof will be readily understood in the light of the description and of the exemplary embodiments which follow, and from FIGS. 1 to 6 which relate to these examples and respectively diagrammatically depict:

in cross section, a cord of 3+9 construction according to the invention, rubberized in situ, of the compact type (FIG. 1);

in cross section, a cord of conventional 3+9 construction, not rubberized in situ, also of the compact type (FIG. 2);

in cross section, a cord of 3+9 construction according to the invention, rubberized in situ, of the type having cylindrical layers (FIG. 3);

in cross section, a cord of conventional 3+9 construction, also of the type having cylindrical layers (FIG. 4);

an example of an installation for twisting and in-situ rubberizing that can be used for the manufacture of cords of the cylindrical type, according to the invention (FIG. 5);

in radial section, a heavy vehicle tyre casing with radial carcass reinforcement, which in this general depiction may or may not be in accordance with the invention (FIG. 6).

I. MEASUREMENTS AND TESTS

I-1 Dynamometric Measurements

For metallic wires and cords, force at break, denoted Fm (maximum load in N), breaking strength denoted Rm (in MPa) and elongation at break denoted At (total elongation in %) are measured under tension in accordance with standard ISO 6892, 1984.

For the diene rubber compounds, modulus measurements are taken under tension, unless indicated otherwise, in accordance with standard ASTM D 412, 1998 (test specimen "C"): the "true" secant modulus (i.e. the one with respect to the actual cross section of the test specimen) is measured in second elongation (i.e. after an accommodation cycle) at 10% elongation, denoted E10 and expressed in MPa (under standard temperature and humidity conditions in accordance with ASTM D 1349 of 1999).

I-2. Air Permeability Test

This test makes it possible to determine the longitudinal permeability to air of the cords tested, by measuring the volume of air that passes through a test specimen under constant pressure in a given time. The principle of such a test, which is well known to those skilled in the art, is to demonstrate the effectiveness of the treatment of a cord at making it impermeable to air; it has been described for example in standard ASTM D2692-98.

The test is performed here either on cords that have been extracted from tyres or rubber plies that they reinforce, and have therefore already been coated from the outside with rubber in the cured state, or on as-manufactured cords.

In the latter case, the as-manufactured cords need to be coated from the outside beforehand with a rubber referred to as coating rubber. For that, a series of 10 cords laid parallel (distance between cords: 20 mm) is placed between two layers or "skims" (two rectangles measuring 80×200 mm) of a diene rubber compound in the raw state, each skim having a thickness of 3.5 mm; all of this is then immobilized in a mould, with each of the cords kept under sufficient tension (for example 2 daN) to guarantee that it lies straight as it is being placed in the mould, using clamping modules; it is then vulcanized (cured) for 40 min at a temperature of 140° C. and at a pressure of 15 bar (rectangular piston measuring 80×200 mm) After that, the entirety is removed from the mould and ten test specimens of cords thus coated are cut out, for characterizing, in the shape of parallelepipeds measuring 7×7×20 mm.

The compound used as a coating rubber is a diene rubber compound conventionally used in tyres, based on natural (peptized) rubber and carbon black N330 (65 phr), also containing the following usual additives: sulphur (7 phr), sulphenamide accelerator (1 phr), ZnO (8 phr), stearic acid (0.7 phr), antioxidant (1.5 phr), cobalt naphthenate (1.5 phr) (phr meaning parts by weight per hundred parts of elastomer); the E10 modulus of the coating rubber is around 10 MPa.

The test is carried out on 2 cm length of cord, which is therefore coated with its surrounding rubber compound (or coating rubber) in the cured state, in the following way: air is injected into the inlet end of the cord at a pressure of 1 bar and the volume of air at the outlet end is measured using a flow meter (calibrated for example from 0 to 500 cm$^3$/min). During measurement, the test specimen of cord is immobilized in a compressed airtight seal (for example a seal made of dense foam or of rubber) so that only the quantity of air passing along the cord from one end to the other along the longitudinal axis thereof is taken into consideration by the measurement; the airtightness of the seal itself is tested beforehand using a solid rubber test specimen, i.e. one with no cord.

The higher the longitudinal impermeability of the cord, the lower the mean air flow rate measured (averaged over the ten specimens). As the measurement is taken with a precision of ±0.2 cm$^3$/min, measured values lower than or equal to 0.2 cm$^3$/min are considered to be zero. They correspond to a cord that can be qualified as airtight (completely airtight) along its axis (i.e. in its longitudinal direction).

I-3. Filling Rubber Content

The quantity of filling rubber is measured as the difference between the weight of the initial cord (therefore rubberized in situ) and the weight of the cord (therefore that of its wires) from which the filling rubber has been removed by treatment in a suitable extraction solvent.

The procedure is for example as follows. A test specimen of cord of given length (for example one meter), coiled on itself to reduce its bulkiness, is placed in a fluid tight bottle containing one liter of toluene. The bottle is then agitated (125 outward/return movements per minute) for 24 hours at room temperature (20° C.) using a "reciprocating shaker" (Fisher Scientific "ping pong 400"); after the solvent has been eliminated, the operation is repeated once. The cord thus treated is recovered and the residual solvent evaporated under vacuum for 1 hour at 60° C. The cord thus rid of its filling rubber is then weighed. The calculation can be used to deduce the filling rubber content of the cord, expressed in mg (milligrams) of filling rubber per g (gram) of initial cord, and averaged over 10 measurements (i.e. over 10 meters of cord in total).

II. DETAILED DESCRIPTION OF THE INVENTION

In the present description, unless expressly indicated otherwise, all the percentages (%) indicated are percentages by weight.

Moreover, any range of values denoted by the expression "between a and b" represents the range of values extending from more than a to less than b (i.e. excluding the end points a and b), whereas any range of values denoted by the expression "from a to b" means the range of values extending from a up to b (i.e. including the strict end points a and b).

II-1. Cord of the Invention

The metal cord of the invention therefore comprises two concentric layers:
- a central first layer or internal layer (Ci) made up of M wire(s) of diameter $d_1$, wound together in a helix, at a pitch $p_1$, where M is greater than 1;
- a second layer or external layer (Ce) comprising N wires of diameter $d_2$, wound together in a helix at a pitch $p_2$, around the first layer (Ci).

By definition, in the present application, the first layer (Ci) is also referred to as the "heart" or core of the cord. When M is greater than 1, it must of course be understood that the diameter denoted $d_1$ of the core (Ci) then represents the diameter of the imaginary cylinder of revolution (or envelope diameter) surrounding the M (2, 3 or 4) central wires of diameter $d_1$.

This cord of the invention can be termed an in-situ rubberized cord, i.e. it is rubberized from the inside, during its actual manufacture, with rubber or a rubber compound known in the present application as "filling rubber".

In other words, in the as-manufactured state, some or preferably all of its "capillaries" or "gaps" (the two terms which are interchangeable denoting the free empty spaces formed by adjacent wires in the absence of filling rubber) situated between the M wire(s) of the core (Ci) and the N wires of the second layer (Ce) and, where appropriate, between the M core wires themselves when M is other than 1, contain a special rubber by way of filling rubber which at least partially fills the said gaps, continuously or discontinuously along the axis of the cord. What is meant by the as-manufactured cord is of course cord which has not yet been brought into contact with a diene rubber (e.g. natural rubber) matrix of a semi-finished product or a finished article made of rubber such as a tyre, that the said cord of the invention would be subsequently intended to reinforce.

This special rubber is an unsaturated thermoplastic elastomer, used alone or with possible additives (i.e. in this case in the form of an unsaturated thermoplastic elastomer composition) to constitute the filling rubber.

It will be recalled first of all here that thermoplastic elastomers (TPE for short) are thermoplastic elastomers in the form of block copolymers based on thermoplastic blocks. Having a structure that is somewhere between that of a thermoplastic polymer and that of an elastomer they are made up in the known way of rigid thermoplastic, notably polystyrene, sequences connected by flexible elastomer sequences, for example polybutadiene or polyisoprene sequences in the case of unsaturated TPEs or poly(ethylene/butylene) sequences in the case of saturated TPEs.

This is why, in the known way, the above TPE block copolymers are generally characterized by the presence of two glass transition peaks, the first peak (the lower, generally negative temperature) relating to the elastomer sequence of the TPE copolymer and the second peak (the positive, higher, temperature typically above 80° C. for preferred elastomers of the TPS type) relating to the thermoplastic (for example styrene blocks) part of the TPE copolymer.

These TPEs are often three-block elastomers with two rigid segments connected by one flexible segment. The rigid and flexible segments can be positioned linearly, or in a star or branched configuration. These TPEs may also be two-block elastomers with one single rigid segment connected to a flexible segment. Typically, each of these segments or blocks comprises a minimum of more than 5, generally more than 10, base units (for example, styrene units and isoprene units for a styrene/isoprene/styrene block copolymer).

That reminder having been given, one essential feature of the TPE used in the composite reinforcement of the invention is that it is unsaturated. An unsaturated TPE by definition and as is well known means a TPE that has ethylene unsaturations, i.e. that contains (conjugated or unconjugated) carbon-carbon double bonds; conversely, a TPE said to be saturated is of course a TPE that has no such double bonds.

The unsaturated nature of the unsaturated TPE means that the latter is (co)crosslinkable, (co)vulcanizable with sulphur, making it advantageously compatible with the unsaturated diene rubber matrices such as those based on natural rubber which are habitually used as calendering rubber in the metal fabrics intended for reinforcing tyres. Thus, any overspill of the filling rubber outside of the cord, during the manufacture thereof, will not be detrimental to its subsequent adhesion to the calendering rubber of the said metallic fabric, as this defect can be corrected during final curing of the tyre by the possibility of co-crosslinking between the unsaturated TPE and the diene elastomer of the calendering rubber.

For preference, the unsaturated TPE is a styrene thermoplastic elastomer (TPS for short), i.e. one which, by way of thermoplastic blocks, comprises styrene (polystyrene) blocks.

More preferably, the unsaturated TPS elastomer is a copolymer comprising polystyrene blocks (i.e. blocks formed of polymerized styrene monomer) and polydiene blocks (i.e. blocks formed of polymerized diene monomer) preferably, of the latter, polyisoprene blocks and/or polybutadiene blocks.

Polydiene blocks, notably polyisoprene and polybutadiene blocks also by extension in this application means statistical diene copolymer blocks, notably of isoprene or of butadiene, such as statistical styrene/isoprene (SI) or styrene-butadiene (SB) copolymer blocks, these polydiene blocks being particularly associated with polystrene thermoplastic blocks to constitute the unsaturated TPS elastomers described hereinabove.

A styrene monomer is understood to mean any monomer based on styrene, either unsubstituted or substituted; examples of substituted styrenes may include methyl styrenes (for example o-methyl styrene, m-methylstyrene or p-methylstyrene, alpha-methylstyrene, alpha-2-dimethylstyrene, alpha-4-dimethylstyrene or diphenylethylene), para-tert-butylstyrene, chlorostyrene (for example o-chlorostyrene, m-chlorostyrene, p-chlorostyrene, 2,4-dichlorostyrene, 2,6-dichlorostyrene or 2,4,6-trichlorostyrene), bromostyrenes (for example o-bromostyrene, m-bromostyrene, p-bromostyrene, 2,4-dibromostyrene, 2,6-dibromostyrene or 2,4,6-tribromostyrene), fluorostyrenes (for example o-fluorostyrene, m-fluorostyrene, p-fluorostyrene, 2,4-difluorostyrene, 2,6-difluorostyrene or 2,4,6-trifluorostyrene), para-hydroxystyrene and blends of such monomers.

A diene monomer is understood to mean any monomer bearing two conjugated or unconjugated carbon-carbon double bonds, particularly any conjugated diene monomer having 4 to 12 carbon atoms selected notably from the group consisting of isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene, and blends of such monomers.

Such an unsaturated TPS elastomer is selected in particular from the group consisting of styrene/butadiene (SB) block copolymers, styrene/isoprene (SI) block copolymers, styrene/butadiene/butylene (SBB) block copolymers, sytrene/butadiene/isoprene (SBI) block copolymers, styrene/butadiene/styrene (SBS) block copolymers, styrene/butadiene/butylene/styrene (SBBS) block copolymers, styrene/isoprene/styrene (SIS) block copolymers, styrene/butadiene/isoprene/styrene (SBIS) block copolymers and blends of these copolymers.

More preferably still, this unsaturated TPS elastomer is a copolymer containing at least three blocks, this copolymer being more particularly selected from the group consisting of styrene/butadiene/styrene (SBS) block copolymers, styrene/butadiene/butylene/styrene (SBBS) block copolymers, styrene/isoprene/styrene (SIS) block copolymers, styrene/butadiene/isoprene/styrene (SBIS) block copolymers and mixtures of these copolymers.

According to a particular and preferred embodiment of the invention, the styrene content in the above unsaturated TPS elastomer is comprised between 5 and 50%, for an optimal compromise between thermoplastic properties on the one hand and the (co)crosslinkable nature of this elastomer on the other.

According to another particular and preferred embodiment of the invention, the number-average molecular weight (denoted Mn) of the TPE (notably TPS elastomer) is preferably comprised between 5 000 and 500 000 g/mol, more preferably comprised between 7 000 and 450 000. The number-average molecular weight (Mn) of the TPS elastomers is determined in the known way, by steric exclusion chromatography (SEC). The sample is firstly dissolved in tetrahydrofuran at a concentration of about 1 g/l and then the solution is filtered through a filter with a porosity of 0.45 μm before injection. The apparatus used is a WATERS Alliance chromatograph. The elution solvent is tetrahydrofuran, the flow rate is 0.7 ml/min, the temperature of the system is 35° C. and the analytical time is 90 min. A set of four WATERS columns in series, with the "STYRAGEL" tradenames ("HMW7", "HMW6E" and two "HT6E"), is used. The injected volume of the solution of the polymer sample is 100 μl. The detector is a WATERS 2410 differential refractometer and its associated software, for handling the chromatograph data, is the WATERS MILLENIUM system. The calculated average molar masses are relative to a calibration curve produced with polystyrene standards.

According to another particular and preferred embodiment of the invention, the Tg of the unsaturated TPE (notably TPS elastomer) (remember, the first Tg relating to the elastomer sequence) is below 0° C., more particularly below −15° C., this parameter being measured in the known way by DSC (differential scanning calorimetry), for example in accordance with standard ASTM D3418-82.

According to another particular and preferred embodiment of the invention, the Shore A hardness (measured in accordance with the ASTM D2240-86) of the unsaturated TPE (notably TPS elastomer) is comprised between 10 and 100, more particularly comprised in a range from 20 to 90.

Unsaturated TPS elastomers such as, for example, SB, SI, SBS, SIS, SBBS or SBIS are well known and commercially available, for example from the company Kraton under the trade name "Kraton D" (e.g., products D1161, D1118, D1116, D1163), from the company Dynasol under the trade name "Calprene" (e.g., products C405, C411, C412), from the company Polimeri Europa under the trade name "Europrene" (e.g., product SOLT166), from the company BASF under the trade name "Styroflex" (e.g., product 2G66), or alternatively from the company Asahi under the trade name "Tuftec" (e.g., product P1500).

The unsaturated thermoplastic elastomer described above is sufficient on its own for the filling rubber to fully perform its function of plugging the capilliaries or gaps of the cord of the invention. However, various other additives may be added, typically in small quantities (preferably at parts by weight of less than 20 parts, more preferably of less than 10 parts per 100 parts of unsaturated thermoplastic elastomer), these for example including plasticizers, reinforcing fillers such as carbon black or silica, non-reinforcing or inert fillers, lamellar fillers, protective agents such as antioxidents or antiozone agents, various other stabilizers, colourants intended for example to colour the filling rubber. The filling rubber could also contain in a minority fraction by weight with respect to the fraction of unsaturated thermoplastic elastomer, polymers or elastomers other than unsaturated thermoplastic elastomers.

The invention of course relates to the cord described hereinabove both in the crosslinked (or vulcanized) state and in the uncrosslinked (or unvulcanized) state. However, it is preferable to use the cord of the invention with a filling rubber in the uncrosslinked state until such time as it is later incorporated into the semi-finished product or finished article such as a tyre for which it is intended, so as to encourage bonding during final crosslinking or vulcanizing between the filling rubber and surrounding rubber matrix (for example a calendering rubber).

Figure 1:
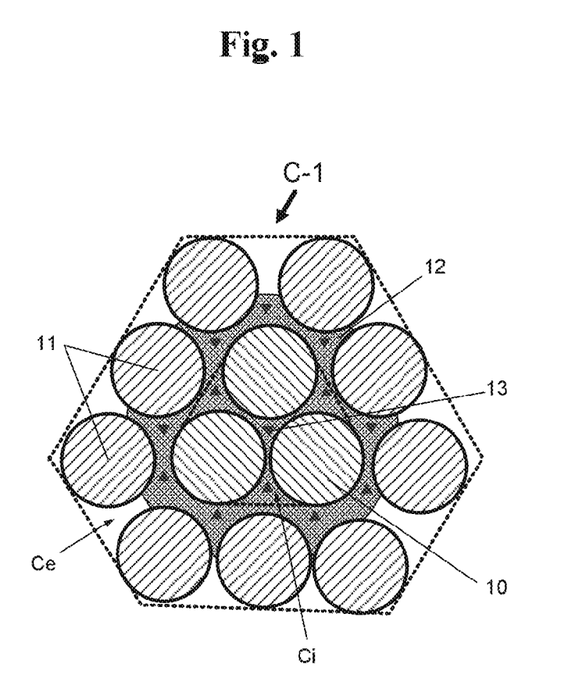

FIG. 1 schematically shows, in section perpendicular to the axis of the cord (which is assumed to be straight and at rest), one example of a preferred 3+9 cord according to the invention in which the core or central layer (C1) is made up of three wires.

This cord (denoted C-1) is of the compact type, that is to say that its internal Ci and external Ce layers are wound in the same direction (S/S or Z/Z to use the recognized terminology) and also at the same pitch ($p_1=p_2$). This type of construction means that the internal (10) and external (11) wires form two concentric layers each of which has a contour (depicted by a dotted line) which is substantially polygonal (triangular in the case of the layer Ci, hexagonal in the case of the layer Ce) rather than cylindrical as is the case of cords with cylindrical layers which will be described later on.

The filling rubber (12) fills the central capilliary (13) (symbolized by a triangle) formed by the three heart wires (10), very slightly moving these apart, while completely covering the internal layer Ci formed by the three wires (10). It also fills each gap or cavity (likwise symbolized by a triangle) formed either by a heart wire (10) and the two external wires (11) immediately adjacent to it or by two heart wires (10) and the external wire (11) adjacent to them; in total, there are thus 12 gaps or capilliaries in this 3+9 example, plus the central capilliary (13).

According to a preferred embodiment, in the M+N cord of the invention, the filling rubber extends continuously around the layer Ci that it covers.

Figure 2:
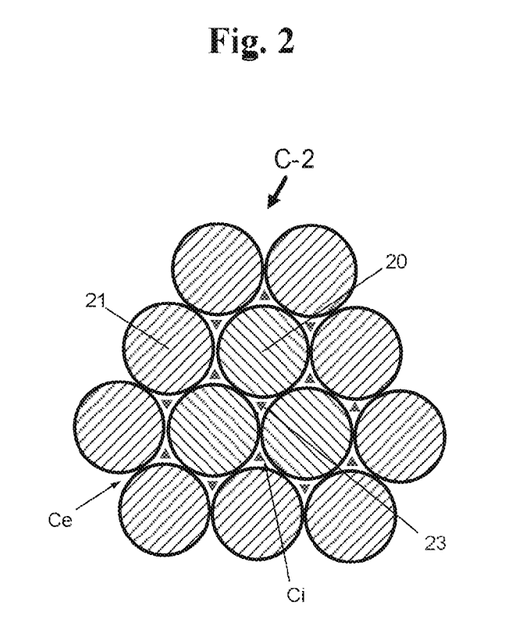

For comparison, FIG. 2 provides a reminder, in cross section, of a conventional 3+9 cord (denoted C-2) (i.e. one that is not rubberized in situ), likewise of the compact type. The absence of filling rubber means that practically all the wires (20,21) are in contact with one another, leading to a structure that is particularly compact, although very difficult (if not to say impossible) for rubber to penetrate from the outside. The feature of this type of cord is that the three heart wires (20) form a central channel or capilliary (23) which is empty and closed and therefore liable, through a "wicking" effect, to allow corrosive media such as water to propagate.

Figure 3:
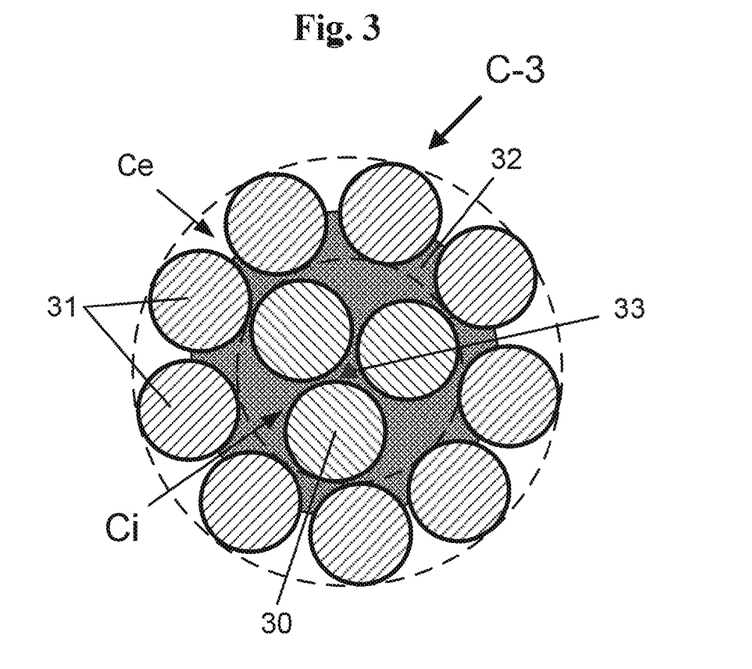

FIG. 3 schematically shows another example of a preferred 3+9 cord according to the invention. This cord (denoted C-3) is of the type with cylindrical layers, i.e. its internal Ci and external Ce layers are wound at the same pitch ($p_1=p_2$) but in a different direction (S/Z or Z/S), or wound at a different pitch ($p_1 \neq p_2$) whatever the directions of twisting (S/S or Z/Z or S/Z or Z/S). In the known way, this type of construction has the effect that the wires are arranged in two adjacent and concentric tubular layers (Ci and Ce) giving the cord (and its two layers) a contour (depicted by a dotted line) that is cylindrical now rather than polygonal.

The filling rubber (32) fills the central capilliary (33) (symbolized by a triangle) formed by the three heart wires (30), slightly moving these apart, while completely covering the internal layer Ci formed by the three wires (30). It also fills, at least in part (and here in this example completely fills) each gap or cavity formed either by a heart wire (30) and the two external wires (31) immediately adjacent (closest) to it, or by two heart wires (30) and the external wire (31) adjacent to them.

Figure 4:
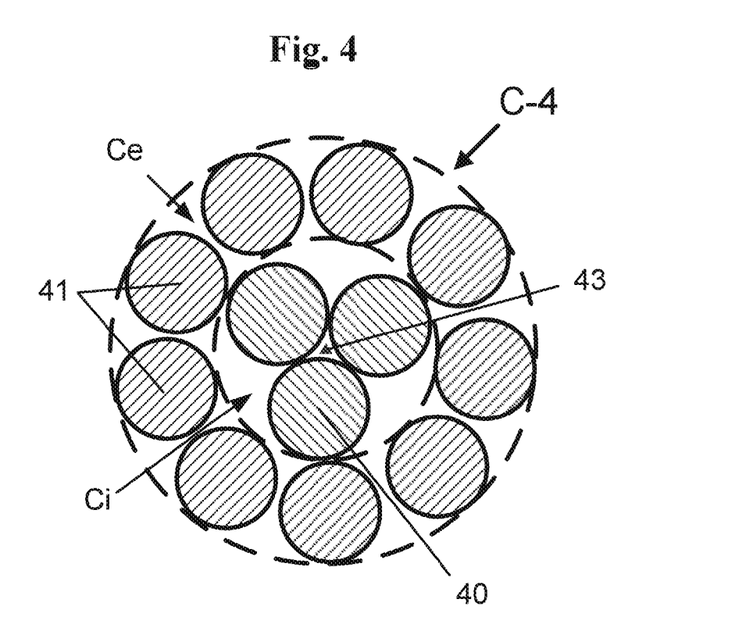

For comparison, FIG. 4 provides as a reminder a cross section of a conventional 3+9 cord (denoted C-4) (i.e. one that is not rubberized in situ), likewise of the type having two cylindrical layers including an external layer (Ce) having nine wires (41). The absence of filling rubber means that the three wires (40) of the internal layer (Ci) are practically in contact with one another, leading to an empty and closed central capilliary (43) which is impenetrable to rubber from the outside and therefore liable to allow corrosive media to spread.

According to a preferred embodiment, over any at least 2 cm length of cord according to the invention, the unsaturated TPS elastomer is present in each of the capilliaries situated between the core (Ci) and the N wires of the second layer (Ce) and between the core wires themselves when M is greater than 1.

According to another preferred embodiment, the filling rubber content in the cord of the invention is comprised of between 5 and 40 mg of rubber per g of cord. Below the indicated minimum, it is more difficult to guarantee that the filling rubber will be present, at least in part, in each of the gaps or capilliaries of the cord, whereas above the indicated maximum, the cord is exposed to a risk of overspill of the filling rubber at the periphery of the cord. For all of these reasons it is preferable for the filling rubber content to be between 5 and 35 mg, notably between 5 and 30 mg.

According to another particularly preferred embodiment, over any portion of cord of length equal to 2 cm, each capilliary or gap of the cord of the invention comprises at least one plug of rubber which blocks this capilliary or gap in such a way that, in the air permeability test in accordance with paragraph I-2, this cord of the invention has a mean air flow rate of less than 2 $cm^3$/min, more preferably less than 0.2 $cm^3$/min or at most equal to 0.2 $cm^3$/min.

For preference N is comprised in a range from 5 to 15. The core (Ci) of the cord of the invention is preferably made up of a single individual wire or at most of 2 or 3 wires, it being possible for the latter for example to be parallel or alternatively twisted together. More preferably still, when M is equal to 1, N is comprised in a range from 5 to 7 and when M is equal to 2 or 3, N is comprised in a range from 6 to 11; when M is equal to 4, N is preferably comprised in a range from 8 to 12.

For an optimized compromise between strength, feasibility, rigidity and flexural endurance of the cord, it is preferable for the diameters ($d_1$ and $d_2$) of the wires of the layers (Ci, Ce), identical or different, to be comprised in a range from 0.08 to 0.50 mm, more preferably in a range from 0.10 to 0.35 mm. Use is preferably made of wires of the same diameter from one layer to the other (i.e. $d_1=d_2$), as this notably simplifies production and reduces the cost of the cords.

It will be recalled here that, as is known, the pitch "p" represents the length, measured parallel to the axis of the cord, after which a wire that has this pitch has made a complete turn around the said axis of the cord.

When the core (Ci) is made up of more than one wire (M greater than 1), the M wires are preferably assembled, notably twisted, at a pitch $p_1$ which is more preferably comprised in a range from 3 to 30 mm, particularly in a range from 3 to 20 mm.

According to another preferred embodiment, the pitches $p_1$ and $p_2$ are equal. This is notably the case for layered cords of the compact type as indicated schematically for example in FIG. 1, in which the two layers Ci and Ce have the other feature of being wound in the same direction of twisting (S/S or Z/Z). In such "compact" layered cords, the compactness is very high such that the cross section of these cords has a contour which is polygonal rather than cylindrical, as illustrated by way of example in FIG. 1 (compact 3+9 cord according to the invention) or in FIG. 2 (control compact 3+9 cord, namely one that has not been rubberized in situ).

According to another preferred embodiment, the pitches $p_1$ and $p_2$ are different. This is notably the case for cylindrical layered cords in which the two layers Ci and Ce may be wound in the same direction of twisting (S/S or Z/Z) or in opposite directions (S/Z or Z/S). In such "cylindrical" layered cords, the compactness is such that the cross section of these cords has a contour which is cylindrical, as illustrated by way of example in FIG. 4 (cylindrical 3+9 cord according to the invention).

In the cord of the invention, the external layer Ce has the preferred feature of being a saturated layer, i.e., by definition, there is not enough space in this layer for an additional wire of diameter $d_2$, or, in other words, at least one ($N_{max}+1$)th wire of diameter $d_2$, to be added to it, $N_{max}$ representing the maximum number of wires that can be wound in a layer around the central layer (Ci). This construction has the notable advantage of offering higher strength for a given diameter of cord.

Thus, the number N of wires may vary to a very large extent according to the particular embodiment of the invention, it being understood that the maximum number of wires N will be increased if their diameter $d_2$ is reduced by comparison with the diameter $d_1$ of the wires of the layer, in order preferably to keep the external layer in a saturated state.

The cords of the invention have the preferable constructions 1+6, 2+7, 2+8, 3+8, 3+9, 4+9 and 4+10. Of these cords, those more particularly selected are those made up of wires having substantially the same diameter from one layer to the other (i.e. $d_1=d_2$).

As already indicated previously, the cord of the invention, like all layered cords, may be of two types, namely of the compact layered type or the cylindrical layered type.

For preference, the layer Ci in the case where M is greater than 1 and the layer Ce are wound in the same direction of twisting, i.e. either in the S direction ("S/S" arrangement), or in the Z direction ("Z/Z" arrangement). Winding these layers in the same direction advantageously minimizes friction between these two layers and therefore wear on the wires of which they are composed.

According to a more preferred first embodiment, the two layers are wound in the same direction of twisting and at the same pitch (i.e. $p_1=p_2$), in order to obtain a cord of compact type as depicted for example in FIG. 1. According to another more preferable embodiment, the two layers are wound in the same direction of twisting and at different pitches (i.e. $p_1 \neq p_2$), in order to obtain a cord of the cylindrical type as depicted for example in FIG. 3.

The term "metal cord" is understood by definition in the present application to mean a cord formed of wires consisting predominantly (i.e. more than 50% by number of these wires) or entirely (100% of the wires) of a metallic material.

Independently of one another and from one layer to the other, the M wire(s) of the core (Ci) and the N wires of the external second (Ce) are preferably made of steel, more preferably still of carbon steel. However it is of course possible to use other steels, for example a stainless steel, or other alloys.

When a carbon steel is used, its content (% by weight of steel) is preferably comprised between 0.2% and 1.2%, notably between 0.5% et 1.1%; these contents represent a good compromise between the mechanical properties required for the tyre and the feasibility of the wires. It should be noted that a carbon content of between 0.5% and 0.6% renders such steels finally less expensive as they are easier to draw. Another advantageous embodiment of the invention can also consist, depending on the applications targeted, in using steels having a low carbon content, for example of between 0.2% and 0.5%, due in particular to a lower cost and to a greater ease of drawing.

The metal or the steel used, whether in particular it is a carbon steel or a stainless steel, may itself be coated with a metal layer which, for example, improves the workability of the metal cord and/or of its constituent elements, or the use properties of the cord and/or of the tyre themselves, such as properties of adhesion, corrosion resistance or resistance to aging. According to one preferred embodiment, the steel used is covered with a layer of brass (Zn—Cu alloy) or of zinc; it will be recalled that, during the process of manufacturing the wires, the brass or zinc coating makes the wire easier to draw, and makes the wire adhere to the rubber better. However, the wires could be covered with a thin layer of metal other than brass or zinc having, for example, the function of improving the corrosion resistance of these wires and/or their adhesion to the rubber, for example a thin layer of Co, Ni, Al, of an alloy of two or more of the compounds Cu, Zn, Al, Ni, Co, Sn.

The cords of the invention are preferably made of carbon steel and have a tensile strength (Rm) preferably higher than 2500 MPa. The total elongation at break (At) of the cord, which is the sum of its structural, elastic and plastic elongations, is preferably greater than 2.0%.

II-2. Manufacture of the Cord of the Invention

The abovementioned two-layered (Ci, Ce) cord of the invention may be manufactured using a process involving at least the following steps:

first of all, when M is greater than 1, a prior step of assembling the M core wires together by twisting in order to form the internal layer (Ci) at an "assembling point";

a step of sheathing the internal layer (Ci) with the unsaturated thermoplastic elastomer extruded in the molten state, by passing through at least one extrusion head;

followed by a step of assembling the N wires of the external layer (Ce) by twisting around the internal layer (Ci) thus sheathed.

Of course, when M is equal to 1, the single wire that constitutes the internal layer (Ci) directly undergoes the step of sheathing with the thermoplastic elastomer without the prior assembling step being needed.

It will be recalled here that there are two possible techniques for assembling metal wires:

either by cabling: in which case the wires undergo no twisting about their own axis, because of a synchronous rotation before and after the assembling point;

or by twisting: in which case the wires undergo both a collective twist and an individual twist about their own axis, thereby generating an untwisting torque on each of the wires and on the cord itself.

Both of the above techniques are applicable, although use is preferably made of a twisting step for each of the above assembling steps.

Upstream of the above-defined sheathing step, the tensile stress applied to each wire of the internal layer is preferably comprised between 10 and 25% of its force at break.

In the above method, the so-called filling rubber is therefore introduced in situ into the cord while it is being manufactured, by sheathing of the internal layer, the said sheathing being performed in the known way for example by passage through at least one extrusion head that delivers the filling rubber in the molten state.

The extrusion head is raised to a suitable temperature, easily adjustable to suit the specific nature of the TPE used and its thermal properties. For preference, the extrusion temperature for the unsaturated TPE is comprised between 100° C. and 250° C., more preferably between 150° C. and 200° C. Typically, the extrusion head defines a sheathing zone which, for example, has the shape of cylinder of revolution the diameter of which is preferably comprised between 0.15 mm and 1.2 mm, more preferably between 0.20 and 1.0 mm, and the length of which is preferably comprised between 1 and 10 mm.

The unsaturated TPE in the molten state thus covers the core via the sheathing head, at a rate of progress typically of a few meters to a few tens of m/min, for an extrusion pump flow rate typically of several $cm^3$/min to several tens of $cm^3$/min. The core is advantageously preheated before it passes into the extrusion head, for example by passing it through an HF generator or through a heating tunnel.

For preference, all the steps defined hereinabove are performed in line and continuously, regardless of the type of cord being manufactured (compact cord or cylindrical layered cord), all of this at high speed. The above method can be carried out at a speed (rate of travel of the cord down the production line) in excess of 50 m/min, preferably in excess of 70 m/min, notably in excess of 100 m/min.

However, it is of course also possible to manufacture the cord of the invention discontinuously, for example by first of all sheathing the central layer (Ci), solidifying the filling rubber then spooling and storing this layer prior to the final operation of assembling the external layer (Ce); solidifying the elastomer sheath is easy; it can be performed by any appropriate cooling means, for example by air cooling or water cooling, followed in the latter instance by a drying operation.

At this stage, manufacture of the cord according to the invention is complete. However, when, according to a preferred embodiment of the invention, the two layers of the cord are assembled by twisting, it is then preferable to add a twist balancing step in order to obtain a cord that is said to be twist balanced; "twist balancing" here in the known way means the cancelling out of residual twisting torque (or untwisting spring-back) exerted on the cord.

The twist balancing tools are well known to those skilled in the art of twisting; they may for example consist of straighteners and/or twisters and/or of twister-straighteners consisting either of pulleys in the case of twisters or small-diameter rollers in the case of straighteners, through which pulleys and/or rollers the cord runs.

For preference, in this cord of the invention thus completed, the thickness of filling rubber between two adjacent wires of the cord, whatever they may be, varies from 1 to 10 µm. This cord can be wound onto a receiving spool, for storage, before being treated, for example through a calendering installation, in order to prepare a metal/rubber composite fabric that can be used for example as a tyre carcass reinforcement or alternatively as a tyre crown reinforcement.

The method described above makes it possible to manufacture cords which, according to one particularly preferred embodiment, may have no, or virtually no, filling rubber at their periphery; what is meant by that is that no particle of filling rubber is visible, to the naked eye, at the periphery of cord, that is to say that a person skilled in the art, would, after manufacture, see no difference to the naked eye, from a distance of three meters or more, between a spool of cord in accordance with the invention and a spool of conventional cord that has not been rubberized in situ.

However, as indicated previously, any possible overspill of filling rubber at the periphery of the cord will not be detrimental to its later adhesion to a metal fabric calendering rubber thanks to the co-crosslinkable nature of the unsaturated thermoplastic elastomer and of the diene elastomer of the said calendering rubber.

The invention applies to cords of the compact type (remember by definition that these are cords in which the layers Ci (if M is greater than 1) and Ce are wound at the same pitch and in the same direction) just as it does to cords of the type with cylindrical layers (remember by definition that these are cords in which the layers Ci (if M is greater than 1) and Ce are wound either at different pitches (whatever their directions of twisting, identical or otherwise), or in opposite directions (whatever their pitches, identical or different)).

An assembly and rubberizing device that can preferably be used for implementing this method is a device comprising, from upstream to downstream in the direction of travel of a cord as it is being formed:

feed means for, on the one hand, feeding the M wire(s) of the internal layer (Ci) and, on the other hand, feeding the N wires of the external layer (Ce);

when M is other than 1, assembling means for assembling the M core wires by twisting, in order to form the internal layer (Ci) at an assembling point;

extrusion means delivering the thermoplastic elastomer in the molten state for sheathing the internal layer Ci (either the single wire that constitutes this internal layer when M is equal to 1, or the collection of the M wires twisted together when M is other than 1);

assembling means for assembling the N wires of the external layer (Ce) by twisting around the internal layer (Ci) thus sheathed.

Figure 5:
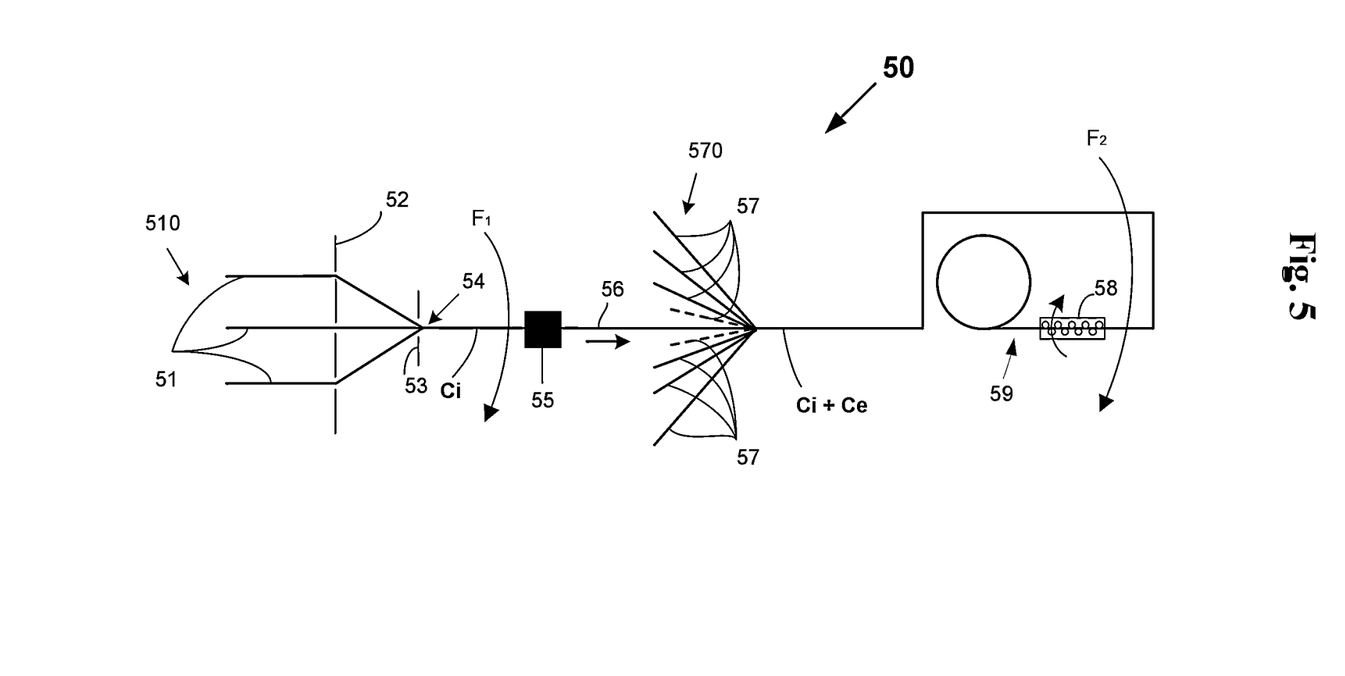

FIG. 5 shows an example of a twisting assembling device (50), of the type having a rotary feed and a rotary receiver (which are symbolized by two arrows in the same direction), which can be used for the manufacture of a cord of the type having cylindrical layers (here, $p_1 \neq p_2$ and the same direction of twisting of the layers Ci and Ce) as illustrated for example in FIG. 3. In this device, feed means (510) deliver three heart wires (51) through a distribution grid (52) (an axisymmetric distributor), which may or may not be coupled to an assembling guide (53), beyond which grid the three heart wires converge on an assembling point (54) in order to form the internal layer (Ci).

The internal layer Ci, once formed, then passes through a sheathing zone consisting, for example, of a single extrusion head through which the internal layer is intended to pass. The distance between the point of convergence (54) and the sheathing point (55) is for example comprised between 50 cm and 1 m. The N wires (57) of the external layer (Ce), of which there are for example nine, delivered by feed means (570), are then assembled by twisting around the internal layer Ci thus sheathed (56), in the direction of the arrow. The final 3+N cord thus formed is finally collected on a rotary receiver (59) after having passed through twist balancing means (58) which, for example, consist of a twister-straightener.

It will be recalled here that, as is well known to those skilled in the art, in order to manufacture a cord of the type having compact layers (pitch $p_1$ and $p_2$ equal and with the same directions of twisting for the two layers) use would have been made of a device comprising just one rotary (feed or receiver) member, rather than two as described hereinabove (FIG. 5) by way of example.

II-3. Use of the Cord of the Invention in a Tyre Crown or Carcass Reinforcement

As explained in the introduction to this text, the cord of the invention is particularly intended for a tyre carcass or crown reinforcement (belt) for industrial vehicles of the heavy vehicle type.

Figure 6:
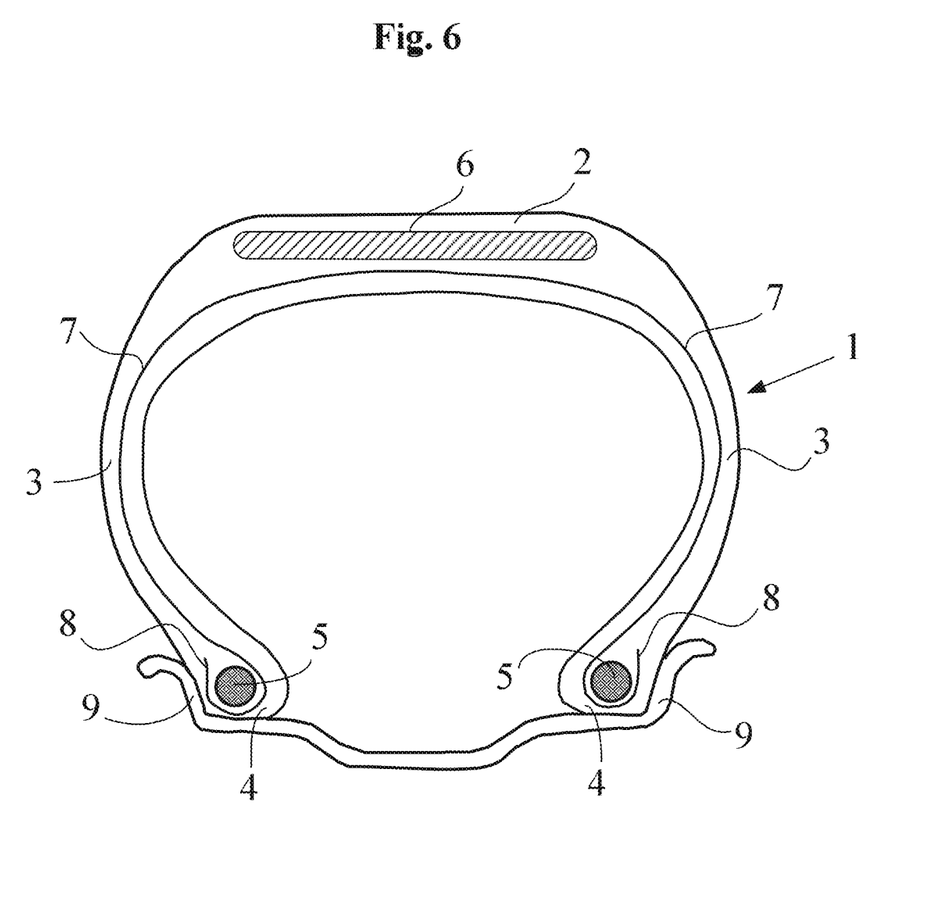

By way of example FIG. 6 schematically depicts a radial section through a tyre with a metal carcass reinforcement that may or may not be in accordance with the invention in this generalized depiction. This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this diagrammatic figure. A carcass reinforcement 7 is wound around the two bead wires 5 in each bead 4, the turn-up 8 of this reinforcement 7 being, for example, positioned towards the outside of the tyre 1, which is here represented fitted onto its wheel rim 9. The carcass reinforcement 7 is, in a way known per se, made of at least one ply reinforced by what are known as "radial" cords which means that these cords run practically parallel to one another and extend from one bead to the other to form an angle comprised between 80° and 90° with the circumferential median plane (plane perpendicular to the axis of rotation of the tyre and which is situated midway between the two beads 4 and passes through the middle of the crown reinforcement 6).

The tyre according to the invention is, for example, characterized in that its carcass 7 and/or its belt 6 comprise/comprises at least one two-layer metal cord according to the invention. In the belt 6 depicted in a very simple way in this FIG. 6, it will be understood that the cords of the invention may for example reinforce all or part of the belt plies referred to as working plies.

The two-layered cords of the invention, compared with the two-layered cords of the prior art rubberized in situ with a conventional (not hot-melt) diene rubber, have the notable advantage that their filling rubber has no unwanted stickiness in the raw (i.e. non-crosslinked) state. Just like these two-layered cords of the prior art, they may further comprise a reduced and controlled quantity of filling rubber, guaranteeing them excellent compactness, this rubber preferably being distributed uniformly within the cord, particularly within each of its capilliaries, thus offering them optimal longitudinal impermeability.

III. EMBODIMENTS OF THE INVENTION

In the following tests, two-layered cords of 3+9 construction made up of fine brass-coated carbon steel wires are manufactured.

The carbon steel wires are prepared in a known manner, for example from machine wire (diameter 5 to 6 mm) which is first of all work-hardened, by rolling and/or drawing, down to an intermediate diameter of around 1 mm. The steel used is a known carbon steel (of the NT type, standing for "Normal Tensile") with a carbon content of around 0.7%, the rest consisting of iron and the usual inevitable impurities associated with the steel manufacturing process. The wires of intermediate diameter undergo a degreasing and/or pickling treatment prior to their subsequent conversion. After a brass coating has been applied to these intermediate wires, what is known as a "final" work-hardening operation is carried out on each wire (i.e. after the final patenting heat treatment) by cold-drawing in a wet medium with a drawing lubricant for example in the form of an aqueous emulsion or an aqueous dispersion.

The steel wires thus drawn have the following diameters and mechanical properties:

TABLE 1

| Steel | φ (mm) | Fm (N) | Rm (MPa) |
|---|---|---|---|
| NT | 0.23 | 114 | 2800 |

These wires are then assembled in the form of 3+9 layered cords (referenced C-3 in FIG. 3) the construction of which is as shown in FIG. 3 and the mechanical properties of which are given in Table 2.

TABLE 2

| Cord | $p_1$ (mm) | $p_2$ (mm) | Fm (daN) | At (%) |
|---|---|---|---|---|
| C-1 | 6.3 | 12.6 | 131 | 2.2 |

The 3+9 cord of the invention (C-3), as depicted schematically in FIG. 3, is formed of 12 wires in total, all of diameter 0.23 mm, which have been wound at two different pitches ($p_1 \neq p_2$) and in the same direction of twisting (S) in order to obtain a cord of the cylindrical layered type. The filling rubber content, measured using the method indicated above at paragraph I-3, is 23 mg per g of cord. This filling rubber fills the central channel or capilliary formed by the three heart wires, separating these slightly, while at the same time completely covering the internal layer Ci formed by the three wires. It also fills, at least in part if not preferably completely, each of the other gaps or capilliaries formed by the wires of the two layers (Ci, Ce).

To manufacture this cord, use was made of a device as described hereinabove and schematically depicted in FIG. 5. The filling rubber consisted of an unsaturated TPS elastomer (in this instance an SBS elastomer with a Shore A hardness of around 70) which was extruded at a temperature of around 180° C., using a twin-screw extruder (length 960 mm, L/D=40) feeding a sizing die of diameter 0.515 mm via a pump, the internal layer Ci moving, while it was being sheathed, at right angles to the direction of extrusion and in a straight line.

The cords C-3 of the invention thus manufactured were then subjected to the air permeability test described at paragraph I-2, measuring the volume of air (in $cm^3$) passing through the cords in 1 minute (averaged over 10 measurements for each cord tested).

For each cord C-3 tested and for 100% of the measurements (i.e. ten specimens out of ten), a flow rate of zero or less than 0.2 $cm^3$/min was measured; in other words, the cords of the invention can be termed airtight along their longitudinal axis.

In conclusion, the cord according to the invention exhibits an optimal degree of penetration by the unsaturated thermoplastic elastomer, with a controlled amount of filling rubber, guaranteeing that internal partitions (continuous or discontinuous along the axis of the cord) or plugs of rubber in the capiliaries or gaps will be present in sufficient number; thus, the cord of the invention becomes impervious to the spread, along the cord, of any corrosive fluid such as water or the oxygen in the air, thus eliminating the wicking effect described in the introduction to this text.

Furthermore, the thermoplastic elastomer used presents no problems of unwanted stickiness in the event of a slight overspill on the outside of the cord after it has been manufactured. In the event of any overspill, its unsaturated and therefore (co)vulcanizable nature makes it compatibile with a surrounding matrix of unsaturated diene elastomer such as natural rubber.

Of course, the invention is not restricted to the embodiments described hereinabove.

Thus, for example, (at least) one linear wire of one of the two layers (Ci and/or Ce) could be replaced by a preformed or deformed wire or, more generally by a wire of a cross section different from that of the other wires of diameter $d_1$ and/or $d_2$, so as, for example, further to improve the penetrability of the cord by the rubber or any other material, the envelope diameter of this replacement wire potentially being smaller than, equal to or higher than the diameter ($d_1$ and/or $d_2$) of the other wires that make up the layer (Ci and/or Ce) concerned.

Without altering the spirit of the invention, some of the wires that make up the cord according to the invention could be replaced by wires other than steel wires, metallic or otherwise, and could notably be wires or threads made of an inorganic or organic material of high mechanical strength, for example monofilaments made of liquid crystal organic polymers.

The invention also relates to any "multistrand steel rope" the structure of which incorporates at least, by way of elemental strand, a layered cord according to the invention.

By way of example of multistrand ropes according to the invention, which can be used for example in tyres for industrial vehicles of the civil engineering plant type, notably in their carcass or crown reinforcement, mention may be made of multistrand ropes with the general construction known per se (M being equal to 1, 2, 3 or 4; N varying from 5 to 15):

(1+5) (M+N) formed in total of six elementary strands, one strand at the centre and the other five strands cabled around the centre;

(1+6) (M+N) formed in total of seven elementary strands, one strand at the centre and the other six strands cabled around the centre;

(2+7) (M+N) formed in total of nine elementary strands, two strands at the centre and the other seven strands cabled around the centre;

(2+8) (M+N) formed in total of ten elementary strands, two strands at the centre and the other eight strands cabled around the centre;

(3+8) (M+N) formed in total of eleven elementary strands, three strands at the centre and the other eight cabled around the centre;

(3+9) (M+N) formed in total of twelve elementary strands, three at the centre and the other nine cabled around the centre;

(4+9) (M+N) formed in total of thirteen elementary strands, three at the centre and the other nine strands cabled around the centre;

(4+10) (M+N) formed in total of fourteen elementary strands, four strands at the centre and the other ten strands cabled around the centre, but in which each elementary strand (or at the very least some of them) made up of an M+N, notably 1+6, 2+7, 2+8, 3+8, 3+9, 4+9, 4+10, two-layered cord of the compact type or of the type having cylindrical layers, is a cord in accordance with the invention.

Such two-layered multistrand steel ropes, for example of the type:

(1+6)(1+6), (2+7)(1+6), (2+8)(1+6), (3+8)(1+6), (3+9)(1+6), (4+9)(1+6), or (4+10)(1+6);

(1+6)(2+7), (2+7)(2+7), (2+8)(2+7), (3+8)(2+7), (3+9)(2+7), (4+9)(2+7) or (4+10)(2+7);

(1+6)(2+8), (2+7)(2+8), (2+8)(2+8), (3+8)(2+8), (3+9)(2+8), (4+9)(2+8) or (4+10)(2+8);

(1+6)(3+8), (2+7)(3+8), (2+8)(3+8), (3+8)(3+8), (3+9)(3+8), (4+9)(3+8) or (4+10)(3+8);

(1+6)(3+9), (2+7)(3+9), (2+8)(3+9), (3+8)(3+9), (3+9)(3+9), (4+9)(3+9) or (4+10)(3+9);

(1+6)(4+9), (2+7)(4+9), (2+8)(4+9), (3+8)(4+9), (3+9)(4+9), (4+9)(4+9) or (4+10)(4+9), (1+6)(4+10), (2+7)(4+10), (2+8)(4+10), (3+8)(4+10), (3+9)(4+10), (4+9)(4+10) or (4+10)(4+10), may themselves be rubberized in situ at the time of their manufacture, that is to say that the or central heart strand of these multistrand ropes may itself be sheathed with a rubber such as a thermoplastic elastomer TPE, notably a TPS elastomer saturated or unsaturated or even with a conventional diene elastomer (e.g. natural rubber) such as those used in in-situ rubberized cords of the prior art.

The invention claimed is:

1. A metal cord that includes two concentric layers having an M+N construction, the cord comprising:
   an internal first layer including M wire(s) of diameter $d_1$, M having a value in a range from 1 to 4, the internal first layer being a core of the cord; and
   an external second layer including N wires of diameter $d_2$ wound together in a helix, the external second layer being positioned around the core,
   wherein, between the wires of the internal first layer and the external second layer are gaps, with at least some of the gaps containing a rubber or a rubber compound, and
   wherein the rubber or the rubber compound includes an unsaturated thermoplastic elastomer.

2. The cord according to claim 1, wherein the unsaturated thermoplastic elastomer is a styrene thermoplastic elastomer.

3. The cord according to claim 2, wherein the unsaturated styrene thermoplastic elastomer includes polystyrene blocks and polydiene blocks.

4. The cord according to claim 3, wherein the polydiene blocks are selected from a group of blocks consisting of: polyisoprene blocks, polybutadiene blocks, and mixtures thereof.

5. The cord according to claim 4, wherein the unsaturated styrene thermoplastic elastomer is a copolymer selected from a group of block copolymers consisting of:
   styrene/butadiene/styrene block copolymers, styrene/butadiene/butylene/styrene block copolymers, styrene/isoprene/stryrene block copolymers, styrene/butadiene/isoprene/styrene block copolymers, and mixtures thereof.

6. The cord according to claim 1, wherein N has a value in a range from 5 to 15.

7. The cord according to claim 1, wherein the external layer is a saturated layer.

8. The cord according to claim 1, wherein the cord is incorporated as a strand of a multistrand rope.

9. A finished or semifinished rubber article or product, the article or product comprising a metal cord that includes two concentric layers having an M+N construction,
wherein the cord includes:
an internal first layer including M wire(s) of diameter $d_1$, M having a value in a range from 1 to 4, the internal first layer being a core of the cord; and
an external second layer including N wires of diameter $d_2$ wound together in a helix, the external second layer being positioned around the core,
wherein, between the wires of the internal first layer and the external second layer are gaps, with at least some of the gaps containing a rubber or a rubber compound, and
wherein the rubber or the rubber compound includes an unsaturated thermoplastic elastomer.

10. The finished or semifinished rubber article or product according to claim 9, further comprising a multistrand rope, wherein the metal cord is incorporated as a strand of the multistrand rope.

11. A tire comprising a metal cord that includes two concentric layers having an M+N construction,
wherein the cord includes:
an internal first layer including M wire(s) of diameter $d_1$, M having a value in a range from 1 to 4, the internal first layer being a core of the cord; and
an external second layer including N wires of diameter $d_2$ wound together in a helix, the external second layer being positioned around the core,
wherein, between the wires of the internal first layer and the external second layer are gaps, with at least some of the gaps containing a rubber or a rubber compound, and
wherein the rubber or the rubber compound includes an unsaturated thermoplastic elastomer.

12. The tire according to claim 11, further comprising a multistrand rope, wherein the metal cord is incorporated as a strand of the multistrand rope.

* * * * *